United States Patent [19]

Jallen

[11] Patent Number: 4,461,957

[45] Date of Patent: Jul. 24, 1984

[54] SPEED TOLERANT ALTERNATOR SYSTEM FOR WIND OR HYDRAULIC POWER GENERATION

[75] Inventor: Gale A. Jallen, Roseville, Minn.

[73] Assignee: Control Data Corporation, Minneapolis, Minn.

[21] Appl. No.: 389,523

[22] Filed: Jun. 17, 1982

[51] Int. Cl.³ .......................... F03D 7/04; F03D 7/00; F03D 7/02; F03D 9/00

[52] U.S. Cl. ......................................... 290/44; 290/55

[58] Field of Search .................. 290/44, 55, 4 R, 4 C, 290/43, 54; 307/45, 86, 87; 322/35, 95, 96; 310/118, 119; 416/DIG. 4; 74/686, 705

[56] References Cited

U.S. PATENT DOCUMENTS

| | | | |
|---|---|---|---|
| 3,974,395 | 8/1976 | Bright | 290/44 |
| 4,146,264 | 3/1979 | Korzeniewski | 290/44 |
| 4,291,233 | 9/1981 | Kirschbaum | 290/44 X |
| 4,333,018 | 6/1982 | Bottrell | 290/44 X |
| 4,357,542 | 11/1982 | Kirschbaum | 290/44 |
| 4,366,387 | 12/1982 | Carter, Jr. et al. | 290/44 X |
| 4,410,806 | 10/1983 | Brulle | 290/55 X |
| 4,418,287 | 11/1983 | Syverson | 290/44 |
| 4,420,692 | 12/1983 | Kos et al. | 290/44 |
| 4,421,967 | 12/1983 | Birgel et al. | 290/44 X |

Primary Examiner—J. V. Truhe
Assistant Examiner—Terry Flower
Attorney, Agent, or Firm—Edward L. Schwarz; Joseph A. Genovese

[57] ABSTRACT

A wind electric generator employs a freewheeling clutch and an induction generator having several synchronous speeds. By selecting the synchronous speed as a function of the ambient wind speed, the generator can be made to operate more efficiently and without overloading. The freewheeling clutch which connects the generator to the wind turbine prevents the generator from acting as a motor when connected to a power grid, and wasting energy in turning the wind turbine.

2 Claims, 4 Drawing Figures

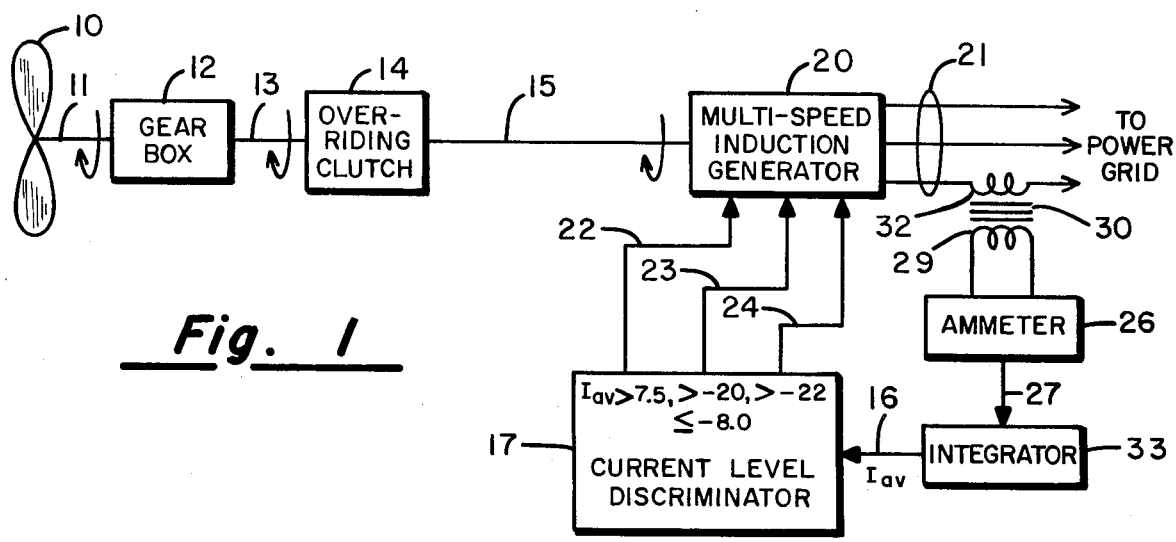
_Fig. 1_
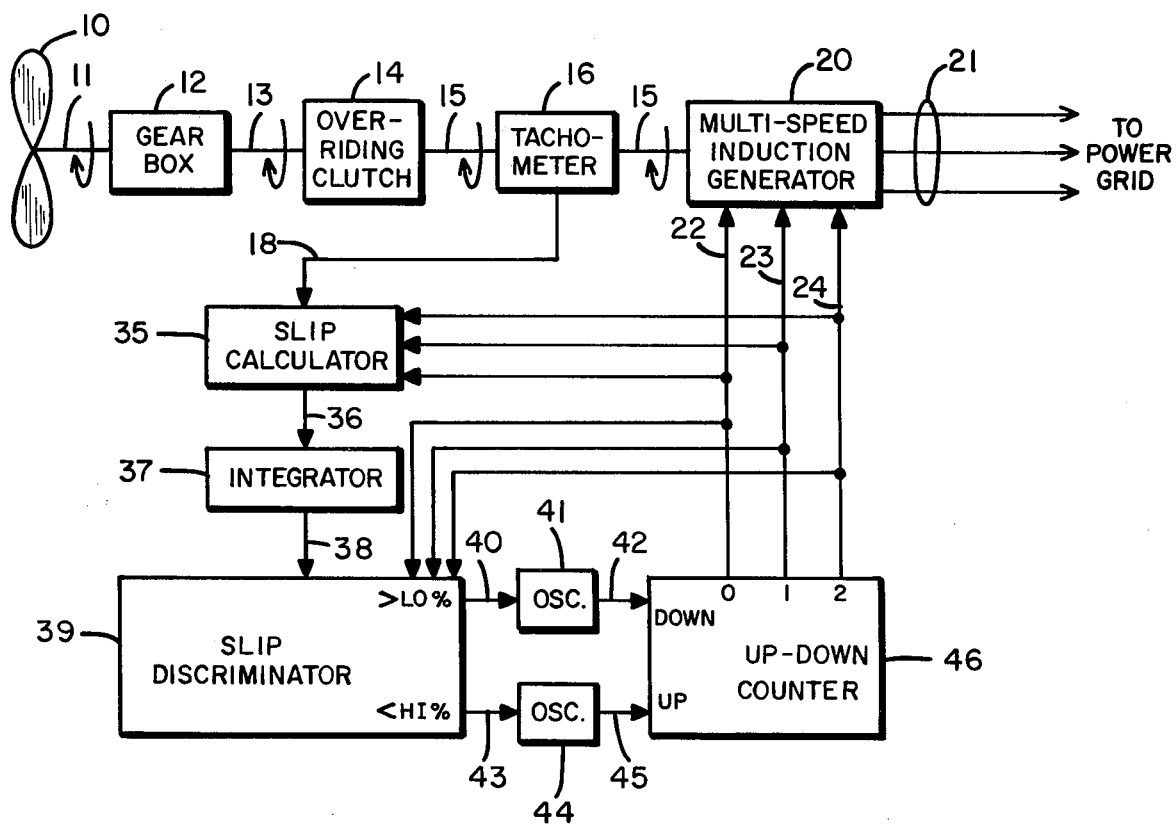
_Fig. 2_

SPEED TOLERANT ALTERNATOR SYSTEM FOR WIND OR HYDRAULIC POWER GENERATION

BACKGROUND OF THE INVENTION

The increased cost of energy from fossil fuel sources which occurred in the years following 1973 has prompted a search for more economical sources of energy. One source used from antiquity is wind. Unfortunately, wind has always had the disadvantage of extreme variability in the energy available from it. Particularly when one attempted to generate electricity from wind power this required some elaborate and expensive scheme for storing the wind energy in times of excess so that it could be used in times of deficiency. In the early designs of wind electric machines for example, this storage technique depended on a bank of lead-acid batteries which could be charged and discharged as the wind speed and demand for energy dictated.

A new concept in energy storage, in part mandated by Federal law, is to use the nation's power grid structure as the storage unit. Excess power generated by a privately owned generating unit can be fed into the power grid. The energy is not really "stored" in the grid, but instead serves to reduce the generating requirements at the utility-owned generating stations. The net use of electricity by the private owner of a wind electric generator can be monitored in the usual fashion, and the account credited or debited accordingly as the private system's owner supplies excess electricity to the grid or uses utility-generated electricity.

Wind generator units which are available now typically employ synchronous electric generation. This requires that the generator speed be controlled very accurately so as to keep the generator frequency and phase in close relationship with the power grid itself. Failure to do so can result in the equivalent of a short circuit between the power grid and the motor, which must be immediately detected by circuit breakers to prevent damage to the generator.

Although not generally realized, an induction generator (which is simply an induction motor) can be used to supply power to a power grid. The grid itself furnishes the necessary excitation current to establish the initial poles. Since an induction motor/generator has no salient poles, the exciting current establishes the poles properly to place the generator in phase with the power grid current. Thereafter, as the power input to the induction motor/generator varies, the slip changes and the poles shift magnetically to match the phase of the power grid current, with the added bonus of acceptable power factor as well. Induction generators are not as efficient in converting mechanical energy to electrical as are synchronous generators, and this is important in very large installations. These installations also can afford the capital costs involved in providing the necessary speed and phase control. But in a situation where the mechanical energy input is nearly free, the efficiency of the generator is not as important as the system capital cost and reliability.

The theory of induction generation has been known for many years. Two representative references, *Alternating Current Machines*, p. 208 ff., 1948, D. Van Nostrand, and *Induction Generator Theory and Application*, Barkle and Ferguson, AIEE Transactions, February 1954, each contain a useful discussion of the induction machine's application for use as a generator. Barkle et al. state that simply placing the induction generator on a power grid which has sufficient synchronous generating capacity is sufficient to automatically synchronize the induction generator with the power grid frequency and phase. Thus, the induction generator enjoys a substantial advantage over the synchronous generator with respect to the amount of control of phase and frequency required for successful operation. In fact, Barkle et al. show that the difference between an induction machine operating as a generator or as a motor is simply whether or not the output shaft is driving a load for motor operation or is being driven by a prime mover. If the machine is to operate as a generator, it must be driven at greater than its synchronous speed, i.e. with "negative" slip. FIG. 3 graphically illustrates this principle. When the machine's shaft speed is less than its synchronous speed identified by the 0 slip line labelled 600-900-1200, it functions as a motor and produces output torque in response to the input of electric power. When a prime mover drives the machine's shaft at greater than the synchronous speed, then electric flow power is out of the machine, and it functions as a generator.

SUMMARY OF THE INVENTION

The foregoing characteristics of the induction generator permit its use as a simple and inexpensive, yet quite efficient, wind electric generator.

In this invention, a wind driven turbine or propeller drives, through a freewheeling or overriding clutch, an induction generator connected to the power grid. The freewheeling clutch transmits torque only from the propeller to the generator and prevents the induction generator from functioning as a motor and driving the turbine with grid power when the wind is light. The induction generator is preferably of the type which has several selectable synchronous speeds. A sensing device measures some preselected system operating parameter, preferably output amperage, and provides a status signal based thereon indicative of the efficiency at which the induction generator is converting mechanical torque to electrical power. A controller receives the output of the sensing device and changes the synchronous speed of the induction generator as necessary to keep the generator operating at the highest possible level of efficiency. As wind speed increases or decreases, the synchronous speed of the generator is respectively increased or decreased to more nearly match the generator synchronous speed to the most efficient turbine speed.

Accordingly, one purpose of this invention is to make small, widely dispersed wind generating stations practical and economical.

Another purpose is to reduce the amount of control hardware necessary to synchronize a wind electric generator with a power grid carrying synchronously generated current.

Another purpose of this invention is to reduce the effects of malfunction of the control mechanism.

Still another purpose is to eliminate the possibility of power flow from the generator unit to the power grid when the wind is light.

BRIEF DESCRIPTION OF THE DRAWINGS

FIG. 1 is a schematic block diagram of the preferred embodiment.

FIG. 2 is a schematic block diagram of a second embodiment of the invention.

DESCRIPTION OF THE INVENTION AND ITS PREFERRED EMBODIMENTS

Figure 3:
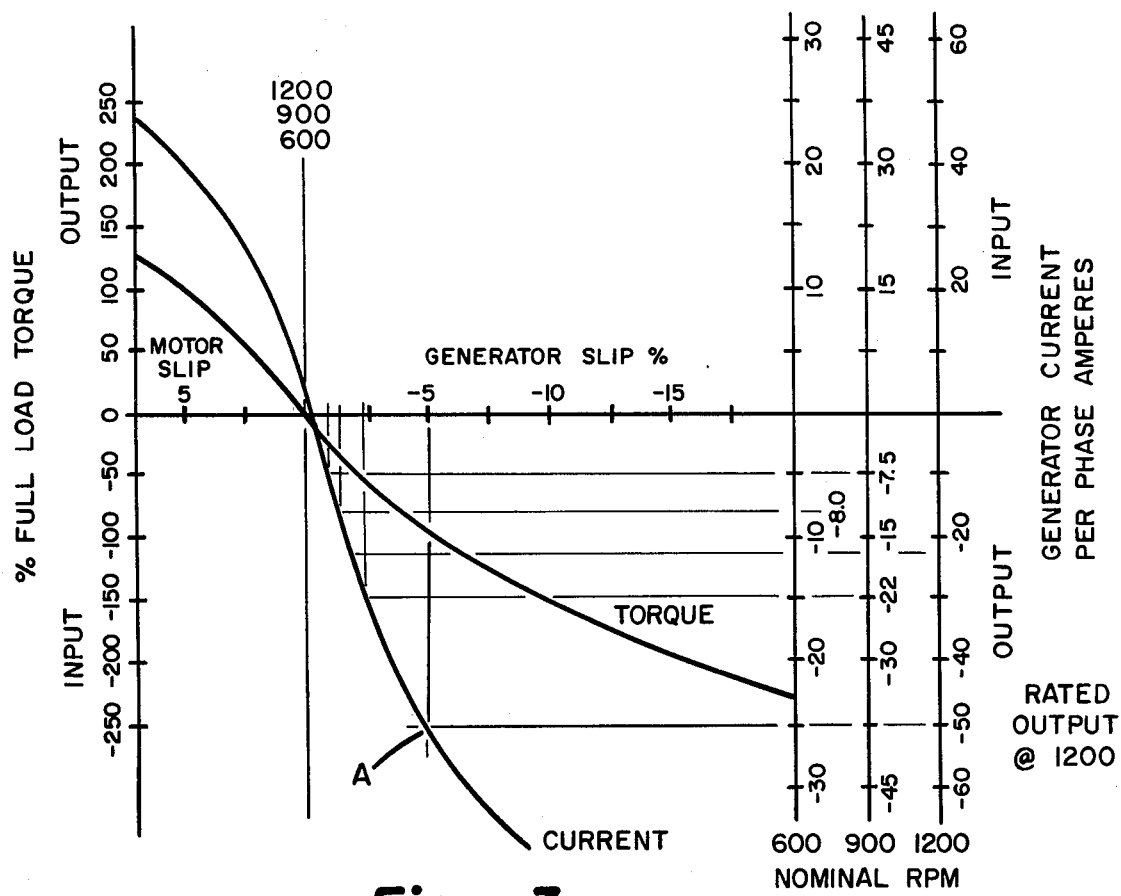
FIG. 3 is a graph of the operating characteristics of the induction generator used for illustrative purposes in the detailed description, and shows generator current for a single phase and torque versus generator slip.

FIG. 1 shows a schematic block diagram of a preferred embodiment wherein the performance is measured by the amperage output from the system. Propeller 10 may be of the conventional two or three blade type employing a vane which keeps it facing upwind, and because of wind characteristics has independently variable energy production. Propeller 10 should have its own feathering mechanism so that when wind-speed exceeds some predetermined value, typically 25-35 mph, no further increase in speed or power output occurs. For the example here, feathering occurs around 26 mph. Shaft 11 supports propeller 10 and transmits its torque to a conventional gearbox 12 which steps up the speed of propeller 10 sufficiently to drive output shaft 13 at slightly above generator 20's synchronous speed when under rated loads. Typically, gearbox 12 has a step-up ratio of from four to eight. The torque output of gear box 12 is transmitted by shaft 13 to an overriding or freewheeling clutch 14. This clutch is one of the type which transmits torque from shaft 13 to shaft 15 if shaft 15 is not being independently driven faster than shaft 13, and effectively prevents the transmission of torque from shaft 15 to shaft 13 if the speed of shaft 15 is greater than that of shaft 13.

Multi-speed induction generator 20 characteristics may vary over a wide range. For illustrative or hypothetical purposes, I have selected a generator 20 having torque and current values versus slip as shown in FIG. 3. Slip is defined as (Synchronous Speed—Actual Shaft Speed)÷Synchronous Speed. Thus for power generation, slip is negative. Generator 20 has three synchronous speeds, 600, 900, and 1,200 rpm, provided by three different windings or groupings of windings. Nominal rated output of generator 20 occurs for the 1200 rpm winding at −5% slip to the right of the 600, 900, 1,200 rpm (0% slip) line. At a given synchronous speed, output current increases in absolute value with increased slip until some point in the range of −10 to −15% slip is reached and the device pulls out of synchronization. Of course continued operation in this range may well cause generator 20 to burn out. For the highest speed winding, 1,200 rpm, a thermal overload system is incorporated which will disconnect generator 20 from the power grid when temperature rise in the windings or the rotor exceeds the safe limit. Impliedly, this will occur whenever operation above the −5% slip point occurs for any substantial length of time. Obviously, the greater the slip, the less time will elapse before overload occurs and the generator is removed from grid 21. After the generator has cooled sufficiently, the thermal overload switch is assumed to reconnect generator 20 to the grid. In FIG. 3, point A on the current curve indicates the −5% slip point which corresponds to 60 rpm of slip for the 1,200 rpm synchronous speed. It is assumed that generator 20 is a three phase device although this is not absolutely necessary. To follow the usual textbook convention, the current flows to and from generator 20 will be considered negative during generation and positive during consumption of power. However, the analysis is equally correct if done in terms of absolute current value. For clarity's sake, the claims will treat current levels in terms of absolute value or magnitude.

The output of generator 20 is supplied through paths 21 to the local power grid. The presence of a substantial synchronous generating capacity on the power grid, as explained earlier, causes generator 20 to supply power which is exactly matched in phase and voltage to that of the power grid when shaft 15 is being driven at reasonable negative slip values for the synchronous speed selected, as shown in FIG. 3. If input torque is not adequate to drive generator 20 at a speed above that of the selected synchronous speed, then FIG. 3 shows that generator 20 will operate as a motor with positive slip in the area to the left of the vertical line labeled 600, 900, 1,200 rpm. If no motor load is applied to generator 20 during this situation, only enough power from the grid to satisfy copper, iron and windage losses will be used. The generated current output shown on the three scales to the right in FIG. 3 are typical or nominal values showing the relative output levels for the three synchronous speeds, and of course can vary greatly depending on the characteristics and size of generator 20.

A particular synchronous speed for generator 20 is selected by connecting various of the several field windings together in a predetermined pattern. These connections are made in response to control signals supplied on paths 22, 23, and 24. If path 22 has a control signal voltage of a preselected level on it, then the 600 rpm synchronous speed will be selected. Similarly, if the preselected control signal voltage is applied to path 23 or path 24 then the 900 or 1,200 rpm synchronous speed respectively, will be selected. It is assumed that only one control path 22-24 at a time will carry the control voltage.

Transformer 30 comprises a low impedance primary winding 32 placed in one path 21 of generator 20 output. The voltage across secondary winding 29 follows the amperage in the path 21 containing winding 32. Ammeter 26 provides an instantaneous current signal whose level closely follows the amperage in the path 21 and comprises a status signal indicating the generator 20 amperage as an operating parameter of the system. Ammeter 26 and transformer 30 comprise a current sensor. Because of the possibility that one of the phases of generator 20 may cease operation for one reason or another, it is desirable that some means be provided to compare the current in all three paths, and signal an alarm if any substantial difference in the three currents is detected.

The output of ammeter 26 is applied on path 27 to integrator 33. Integrator 33 preferably provides a signal voltage which is a moving average of the current signal supplied by ammeter 26. That is, in one embodiment, as variations occur in output amperage, integrator 33 provides the time average of the current flow for a selected time interval immediately preceding the present instant. This time interval will typically range from perhaps 2 to 5 minutes depending on the characteristics of the wind regimes occurring at the installation and the type and size of propeller 10 and generator 20 employed. Thus, short term variations in current will be smoothed by integrator 33.

It is not at all unusual to find wind regimes where a steady state wind of 10 mph may have peak wind gusts of 20 mph or more of a few seconds duration. When one considers that energy in the wind varies as the cube of wind velocity, one realizes that even relatively small gusts can cause substantial changes in amperage output from generator 20. This is in spite of the fact that the mechanical mass of the drive train and generator 20 will tend to reduce the instantaneous current variations caused by such wind gusts. By using integrator 33, the integrated current value on path 16 will change relatively gradually, which has substantial advantages with regard to control of generator 20.

The output of integrator 33 is fed on path 16 to current level discriminator 17 which functions as a control signal generator. Discriminator 17 along with integrator 33 in essence comprises a controller which selects the desired synchronous speed for generator 20 according to a preselected functional relationship with ammeter 26 output. Discriminator 17 may typically comprise a series of operational amplifiers which compare the output voltage of integrator 33 on path 16 with preselected voltage standards and provide a preselected voltage output when the input voltage is above or below the standard depending upon the specific design and amplifier selected. Such a voltage detector or discriminator circuit is well-known in the art and no further notice need be taken of its precise design. Suffice it to say that discriminator 17 provides a control voltage level on control signal path 22 and essentially 0 volts on control signal paths 23 and 24 when the input voltage from path 16 indicates a current level in the tested output current path 21 which is more positive than or equal to −7.5 amp., according to the illustrative system here described. When the average current in each of the paths 21 as calculated by integrator 33 for the selected time period, is between −8.0 amp. and −20.0 amp., then discriminator 17 provides the control signal voltage on path 23 and 0 volts on paths 22 and 24. Similarly, when average current in each of the paths 21 exceeds 22.0 amp., then the control signal voltage is placed on path 24, and paths 22 and 23 carry no voltage. Discriminator 17 is so designed that no output change occurs when average current enters the dead bands of 7.5 to 8.0 amp. or 20.0 to 22.0 amp.

Figure 4:
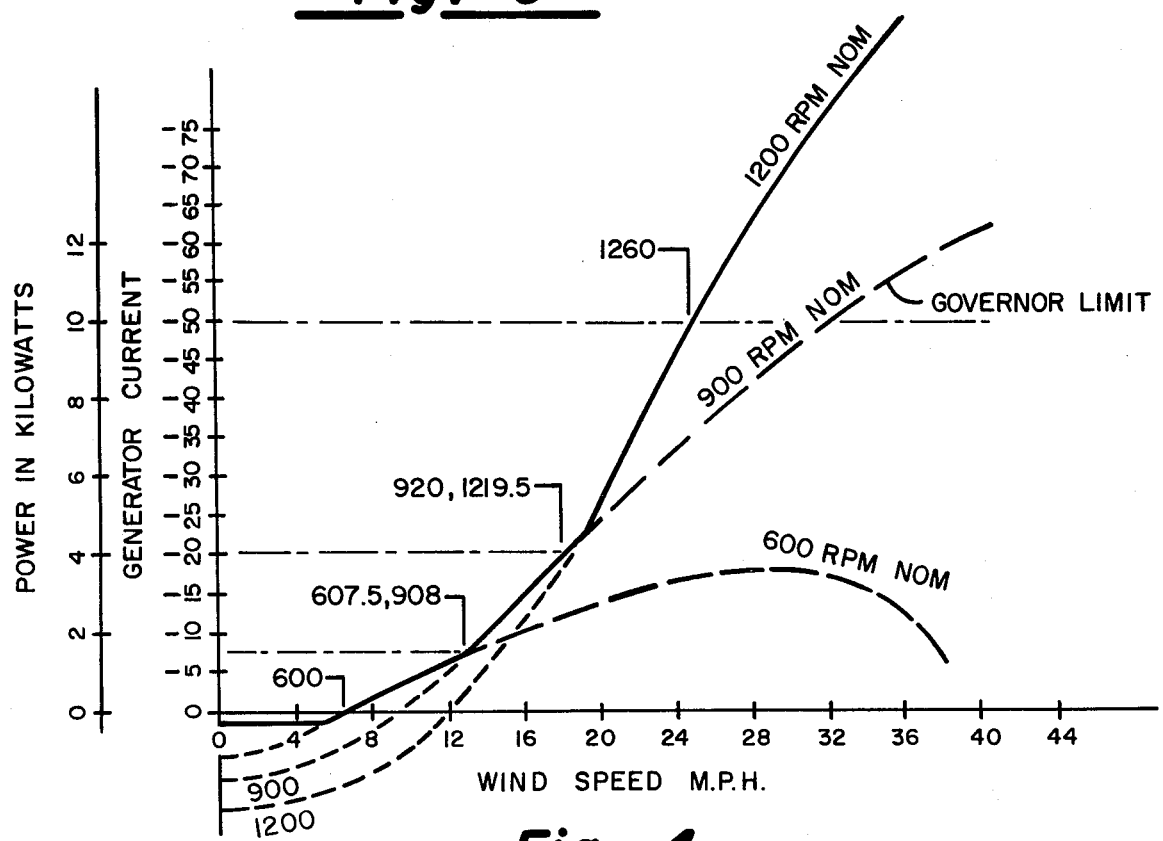
FIG. 4 is a graph relating the output of the generator to the speed of the wind impinging on the propeller, and displaying ideal synchronous speed change points.

To understand the operation of this generating system, it is useful to first relate the torque and current output versus slip graphs of FIG. 3 to the current output versus wind speed graph shown in FIG. 4. As mentioned earlier, the convention that current flow is negative during generation of elective power is shown by negative values for current and torque scales in the generator quadrant. The current is presumed for this illustrative system to be that in a single phase of generator 20. The graph takes into account the aerodynamic response of propeller 10, as well as the electromechanical response of generator 20. The "607.5, 908" and "920, 1219.5" notation indicates the approximate speed change which occurs when generator 20 synchronous speed is changed by discriminator 17. The dotted line portions of each curve represent parts of that curve at which generator 20 does not normally operate in this illustrative system. The point labelled 607.5, 908 (rpm) represents the point of about −1.25% slip for the 600 rpm synchronous speed of generator 20 and the maximum speed normally employed for the 600 rpm speed. This is because the current curve of the 600 rpm synchronous speed falls below that of the 900 rpm speed at this rpm and slip. Thus to run on the part of the 600 rpm synchronous speed curve past this point does no harm but reduces power generated. The solid line portion between the 607.5, 908 and 920, 1219.5 rpm points represents the part of the 900 rpm synchronous speed curve which the system is designed to use, and corresponds to a slip range of about −0.8% to −2.2% when generator 20 operates within its 900 rpm synchronous speed. The solid line curve between the 920, 1219.5 speed point and the 1,260 rpm speed points represent the portion of the 1,200 rpm synchronous speed slip range which is used.

To explain the operation of this device, let's assume that the wind is at some time totally still, as explained earlier, and propeller 10 is therefore not turning. In this case, generator 20 is operating as a motor with no load, using a minimal level of power on paths 21 from the power grid, and spinning its input shaft 15. Overriding clutch 14 prevents any of this torque from being transmitted to path 13 and causing propeller 10 to be driven as a fan blade. Without the presence of clutch 14, generator 20 will draw a very large amount of current and power from the power grid during periods of little wind and substantially reduce the system's overall efficiency. With clutch 14 present however, generator 20 simply draws enough current to satisfy its copper, iron and windage loss power requirements, typically about 5% of full load power. Thus for this illustrative system, though nominal full load current is about −50 amp. per phase for the 1,200 rpm synchronous speed, around 2 amp. or 500 watts per phase are drawn in the no load circumstance. This current flow, since it is opposite to the direction of current flow while generator 20 is producing current is for purposes of discriminator 17, is considered to be positive. Accordingly, integrator 16 indicates current flow more positive than −7.5 amp. in paths 21, causing the control voltage to be placed on control path 22, selecting the 600 rpm synchronous speed.

Assume now that wind speed increases to a steady state 10 mph. Propeller 10 starts spinning and drives shaft 13 to a speed faster than that which generator 20 is turning shaft 15. Therefore clutch 14 startes transmitting torque from shaft 13 to generator 20 and generator 20 starts sending power through paths 21 to the power grid. Since the hypothesized wind speed is 10 mph, FIG. 4 shows that the output of generator 20 will be between 0 and −7.5 amp. per phase, and the signal on path 16 will reach a steady state indicating a current level of between 0 and −7.5 amp. Therefore no change will occur in the control signal outputs from discriminator 17.

Assume now that steady state wind speed increases to 16 mph. After a portion of the time period of integrator 33 has elapsed, the current on each path 21 will cross the dead band between −7.5 and −8.0 amps. and become more negative than −8.0 amp, as shown by the horizontal line extending leftward from −8.0 amp. on the 600 rpm scale. This causes the output of discriminator 17 to change so that signal path 23 carries the control voltage specifying 900 rpm as the synchronous speed and drops the voltage on paths 22 to 0, leaving the voltage on path 24 unchanged at 0. This causes both generator 20 and propeller 10 to begin accelerating. Generator 20 accelerates as a motor to seek its new synchronous speed of 900 rpm. Propeller 10 accelerates because overriding clutch 15 has removed the load of generator 20 from shaft 11. Whether propeller 10 or generator 20 provides the major accelerating force to the system is not important. During this time of acceleration, current from generator 20 on paths 21 will certainly shift toward 0, and conceivably may even begin flowing through paths 21 into generator 20 to provide accelerating torque to the new synchronous speed. Integrator 33 will provide an output on path 16 which will sag slightly during this transitional period, but because of the moving average method employed to generate the current signal on path 16, the sag will be quite small. Since discriminator 17 will not change its output signal pattern unless the input signal on integrator 33 indicates the average amperage is between 0 and −7.5 amp. and since it is assumed that generator 20 will be producing power between −8.0 and −20.0 amp. per phase before integrator 33 output can change to indicate amperage between 0 and −7.5 amp., no change in the output of discriminator 17 will occur. Of course, the dead band width of 0.5 amp. can be varied to suit the wind regimes and generating system involved. Once a new generator 20 speed of perhaps 912 rpm is reached, generation occurs at a somewhat higher current level than is possible at the 600 rpm synchronous speed. This improvement can be determined from FIG. 4 as the current difference shown by the intersection of a vertical line passing through the 16 mph point of the abscissa with the 600 and 900 rpm synchronous speed curves, or about 4.5 amp. per phase.

Assume that wind speed continues to increase and that at some later point it is found to be 20 mph for the time period of integrator 33. According to FIG. 4, a 20 mph wind causes the output of generator 20 to cross −22 amp. After a certain period of time the moving average computed by integrator 33 and carried in the output on path 16 will indicate a current level more negative than −22 amp. This will cause current level discriminator 17 to again change its output signal pattern with the control voltage now present on control signal path 24, and the voltage on control signal paths 22 and 23 at 0. Again generator 20 may briefly draw current from the power grid while it and propeller 10 are accelerating to the new synchronous speed of 1,200 rpm. Again, the output of integrator 33 on path 16 will briefly show a slight sag caused by this change in amperage on path 21. However, again the dead band of 2 amp. between 20.0 and 22.0 amp. is sufficient to prevent any change in discriminator 20's output signal during this transitional period.

For further increases of wind speed, no further change in synchronous speed will occur in this design until propeller 10 feathers or generators 20 overheats. As FIG. 4 shows, increasing wind speed can substantially increase the current output from generator 20 so that at, say, 1,260 rpm (26 mph), point A of FIG. 3, the current output (−50 amp.) is about 13 times that at 11 mph and about 604 rpm. This is to be expected because of the cubic relationship between wind speed and the energy available from the wind. When wind becomes so high that generator 20 begins to overheat around 27 to 30 mph, and is disconnected by the thermal protectors, then propeller 10 feathers to prevent its destruction by overspeeding.

It may seem that the complexity of this control system for wind changes within the 6-18 mph range is hardly justified considering the relatively small amount of energy available compared to that available for greater wind speeds. There are several factors that refute this analysis. First and most importantly, average wind speeds of greater than, say 15 or 16 mph are relatively infrequent in most geographic locations within the United States. For typical geographical locations, wind speed may average between 9 and 12 mph, with only one day in 4 or 5 where wind speed averages above 15 mph. For most of these locations, two thirds of the wind energy is available from wind regimes averaging between 10 and 16 mph. Therefore, substantial improvements in average current output is available by improving the efficiency of converting wind to electric energy in the 10 to 16 mph range. Secondly, note that the 1,200 rpm nominal curve indicates that current generation starts at a wind of 12 mph for the illustrative generator here. Since the current output versus slip curve of FIG. 3 can be flattened only at the expense of less efficiency in the lower ranges of slip, it is not possible to provide a single speed induction generator which allows generation of power over the whole range of wind speeds without either overloading the generator at the high wind speeds or completely losing the opportunity to generate at low wind speeds. Alternatively, by using a wound rotor with variable resistance in generator 20, the range can be extended, but at the expense of lower generating efficiency throughout the range. Lastly, it should be observed that a multi-speed generator is not substantially more expensive, certainly not when manufactured in quantity, then a single speed induction machine. The control circuitry too is quite inexpensive in comparison to the cost of the mast on which propeller 10 is mounted, and the costs of the gearbox 12 and propeller 10 itself.

As stated earlier, a −5% slip is assumed to be the full load point for generator 20 at its highest synchronous speed, i.e. the maximum load at which continuous operation can occur. For wind speeds of greater than approximately 26 mph, generator 20 will be operating in an overload condition. The overload protection mentioned earlier for generator 20 is designed to disconnect generator 20 from the power grid if wind speed causes thermal overload. Propeller 10 and generator 20 should be matched to the prevailing wind regimes according to well known principles so that thermal overload will be a relatively rare event, for during that period of time, no power will be available from a wind regime which has the capability to provide very large amounts of power. Furthermore, unless additional complexity is present in the control system, the lack of output current on paths 21 will cause discriminator 17 to reset the generator synchronous speed to 600 rpm. This will necessitate very rapid shifting from the 600 to the 1,200 rpm synchronous speed for a very short period of time, after generator 20 has cooled enough to permit its reattachment to the power grid.

Another problem to be addressed is that of runaway of propeller 10 when generator 20 has disconnected itself from the power grid due to thermal overload. Since generator 20 no longer provides torque to restrain the speed of propeller 10, propeller 10 will accelerate until its own aerodynamic drag matches the lift being created by its airfoils. This is a very dangerous condition and well known to those familiar with this art. The tremendously high speeds which such a propeller can reach in high winds under no load conditions may cause its destruction by bending its blades until they strike the mast or by their flying apart from centrifugal force. Accordingly, as mentioned earlier propeller 10 is designed with a feathering mechanism which is activated at some preselected propeller speed, in this example that corresponding to approximately 1270 rpm on shaft 15, by rotating the blades of propeller 10 to a position more nearly edgewise to the wind direction. Lift on the blades of propeller 10 is thus decreased and drag increased until wind speed again drops down into the range where generator 20 can convert all of the wind energy available on shaft 15 into electric power. This approach can in fact be used to limit propeller 10's maximum speed to correspond to 1260 rpm for the generator, and in this way avoid overloading.

When wind speed begins to decrease, and average current output as indicated on path 16 becomes more positive than −20.0 amp., then discriminator 17 changes the output voltages on paths 22–24 such that generator 20 resets to its 900 rpm synchronous speed. Propeller 10 immediately begins slowing down to match the new synchronous speed. During this short time, output amperage on paths 21 may momentarily surge to a large value, yet integrator 33 will average this peak, allowing the average current represented by the signal on path 16 to change only slightly, and "hunting" from one to another of the synchronous speeds can't occur. The dead band between −20 and −22 amp. in the design of discriminator 17 is insurance against any false switching of the synchronous speed.

As wind speed decreases still further, eventually the average current indicated by the signal on path 16 will fall between 0 and −7.5 amp. Another change in the output of discriminator 17 sets the control voltage on path 22 with paths 23 and 24 at 0 volts, causing generator 20 to assume its 600 rpm synchronous speed, and propeller 10 to slow still further to match this value. In this way, the system is adjusted to provide for relatively low wind speed generation and efficient conversion at relatively high wind speed as well.

A last potential problem for this design is shown by FIG. 4. For say, the 600 rpm synchronous speed there are two points on the curve which provide 7 amp. current output, one at approximately 12 mph and another at approximately 37 mph. Obviously, ammeter 26 output on path 27 does not provide any means of distinguishing between these two operating points. Integrator 33 output provides a means of slowing the response to changes in the generator current, caused by a sudden wind increase. As long as the shift points are kept a reasonable distance from the point of maximum current for a given synchronous speed, discriminator 17 will have plenty of time to change synchronous speed before the peak amperage has been passed and current begins to drop with increasing wind speed. In general, the efficiency of a well matched propeller and generator in this system dictates shifting well before this maximum current output point is reached.

A second system operating parameter which one can profitably employ in monitoring the performance of a generating system employing a multi-speed induction generator, is slip itself. At the present time, slip (or shaft speed, which is nearly the same thing) must be determined by employing a tachometer 16 which measures shaft speed of generator 20. Because tachometer 16 creates additional mechanical complexity, the overall reliability of the system is somewhat impaired. Since no real advantages result from using slip as the system performance characteristic, this is therefore not the preferred embodiment. Nonetheless, such a system does have merit and may be useful in certain circumstances.

In FIG. 2, the mechanical system is essentially identical to that of FIG. 1 save for tachometer 16 which measures the speed of shaft 15 rotation. Tachometer 16 is preferably one of electronic design which measures electrical pulses created by a rotating toothed wheel or magnet attached to shaft 15. The output of tachometer 16 is supplied on path 18 to a slip calculator 35. Slip calculator 35 also receives the control signals which specify the synchronous speed selected for generator 20. Using the actual measured shaft 15 speed in conjunction with the synchronous speed specified by the signals on paths 22–24, slip calculator 35 produces a slip signal which encodes the actual slip conditions for generator 20 in real time. Because slip varies drastically each time the synchronous speed is changed, slip calculator 35 includes a limiting function which holds its output to between +1% and −6%, although other values may serve equally well, both in this and other systems. Instantaneous slip greater than +1% or less than −6% is encoded as +1% or −6% respectively in the output of slip calculator 35 on path 36.

Integrator 37 receives the output of slip calculator 35 on path 36, and forms a moving average of the slip based on a selected interval immediately preceding the present instant, in the same fashion that integrator 33 in FIG. 1 formed the moving average of the current. Again, 2 to 5 minutes is a reasonable range of values for the averaging interval. The output of integrator 37 is supplied on path 38 to slip discriminator 39. Logical 1 outputs from discriminator 39 on paths 40 and 43 are generated when, respectively, integrator 37 output is between 0 and a so-called "LO" value which depends on the current synchronous speed, or is more negative than a so-called "HI" value which also depends on the synchronous speed. For a system having the characteristics shown by FIGS. 3 and 4, and which changes speeds at approximately the same output amperage the system of FIG. 1 does, the following table summarizes speed change points in terms of slip for each synchronous speed:

| Synchronous Speed | LO Slip Value | HI Slip Value |
|---|---|---|
| 600 | 0 | −1.30% |
| 900 | −0.80% | −2.25% |
| 1200 | −1.60% | — |

The symbology used in the rectangle representing discriminator 39 includes the values of this table. The electronic response of discriminator 39 to various inputs on path 38 and 22–24 is as follows: A logical 1 signal is produced on path 43 when the time average slip received from integrator 37 is more negative than −1.30% and the synchronous speed is 600 rpm or when the time average slip is more negative than −2.25% and the synchronous speed is 900 rpm. A logical 1 signal is produced on path 40 when the time average slip is greater than 0% (motor operation) and the synchronous speed is 600 rpm; or such slip is less negative than −0.80% and the synchronous speed is 900 rpm; or such slip is less negative than the −1.60% and the synchronous speed is 1200 rpm. The outputs of discriminator 39 are logical 0's whenever these conditions don't exist.

The outputs from discriminator 39 are supplied on paths 40 and 43 to oscillators 41 and 44, respectively. Oscillator 41 receives a logical 1 output from discriminator 39 corresponding to a slip more positive than the −0.80% or −1.60% values and oscillator 44 receives a logical 1 output of discriminator 39 corresponding to a slip more negative than the −1.30% or −2.25% values. Each of these oscillators alternately produces logical 1's and 0's responsive to receiving a logical 1 on the associated input signal path. Oscillators 41 and 44 cycle times should be long enough to prevent any instability in the control system from causing during normal operation more than one pulse input to up-down counter 46, typically a period of a few milliseconds or so. Counter 46 controls the synchronous speed of generator 21. The up and down shift points for slip must be carefully chosen so that once the new slip value is established, it isn't below the shift down or up point respectively, of the new speed, given constant wind speed. If the slip ranges overlap somewhat during shift up and shift down, then the system will not hunt from one synchronous speed to another during steady state wind. This overlap corresponds to the amperage dead bands of the apparatus shown in FIG. 1.

Up-down counter 46 has a range of output values limited to producing a signal on one of the three separate output paths, labeled 0, 1, and 2 for convenience, and which correspond respectively to the generator control signals on paths 22–24. A count-down input receives the signal on path 42 from oscillator 41, where a change from logical 0 to logical 1 will cause the counter value to decrement by 1 if not already at 0. If the contents of counter 46 are already 0, it will not be counted down further. A change from logical 0 to logical 1 on path 45 at the count-up input causes the contents of up-down counter 46 to increase by 1. However, if the contents of counter 46 are already 2, it will remain unchanged. When the contents of counter 46 are 0, the control signal voltage is placed on path 22 and path 23 and 24 are set to 0 volts. A counter 46 content of 1 causes path 23 to carry the control signal voltage and path 22 and 24 to carry 0 volts. Similarly, a value of 2 in counter 46 causes path 24 to carry the control signal voltage and path 22 and 23 to carry 0 volts. One will recall from the discussion of FIG. 1 that control signal voltages on one of paths 22, 23, or 24 respectively select synchronous speeds of 600, 900, or 1,200 rpm for generator 20.

It is convenient to describe the operation of the apparatus in FIG. 2 in the same manner used in describing the apparatus of FIG. 1. The wind is first assumed to be below that causing any useful generation. Regardless of previous circumstances, slip computed by slip calculator 35 will be positive (since generator 20 is operating as a motor) causing oscillator 41 to periodically issue logical 1 pulses to the count-down terminal of counter 46. Therefore, regardless of the previous contents of counter 46, within the interval of two oscillator 41 cycles, counter 46 contents will be set to 0. This situation will persist with generator 20 acting as a motor and driving shaft 15 at the lowest synchronous speed until wind increases the rotational speed of propeller 10 and generator 20 is operating between the 0 and −1.30% slip levels. The output of integrator 37 will slowly change until the signal on path 38 indicates a new average value of slip between 0 and −1.30%. This causes the output on path 40 from discriminator 39 to change from a logical 1 to a logical 0 and oscillator 41 ceases operation. The contents of up-down counter 46 will then remain at 0.

As wind speed increases, slip also becomes more negative until eventually the time average value of slip produced by integrator 37 crosses the −1.30% level. This condition causes discriminator 39 to change the signal on path 43 from a logical 0 to a logical 1 and oscillator 44 to being operation. Oscillator 44 changes the output on path 45 from a logical 0 to a logical 1 for a period of time causing up-down counter 46 to change its contents from 0 to 1. This changes the synchronous speed of generator 20 from 600 to 900 rpm. Immediately generator 20 starts accelerating to the new synchronous speed, and propeller 10 also accelerates to match this new synchronous speed. Before oscillator 44 can issue a second pulse, the logical 1 on path 23 resets discriminator 39 to place the slip value encoded on path 38 within the LO and HI slip values for the new 900 rpm synchronous speed. Because it is possible that the actual instantaneous slip will become more positive than +1% during part of the time it takes for generator 20 to be driven by propeller 10 again into the slip region of −0.8% to −2.25% corresponding to the new 900 rpm synchronous speed, it is necessary that slip during this transition period be limited to +1% to prevent the time averaged slip to fall between 0 and −0.80%. Note that the slip which generated the speed change in the first place was more negative than −1.30% which to cause an improper speed change must be time averaged to between 0 and −0.80%. Using +1% (or some other suitable value) rather than the actual instantaneous value of around +30% at the instant the output of counter 23 changes, prevents the integrated value from dropping into the 0% to −0.80% range during the transition. After these short term instabilities fade out, FIG. 4 shows that a steady state value for the slip encoded on path 38 will slowly reach approximately −0.90% which is within the −0.80% to −2.25% range for the 900 rpm speed, thereby preventing hunting between synchronous speed changes caused by failure of the slip ranges to overlap. The period of oscillator 44 need be only long enough to permit counter 46 to change its output from a logical 1 on path 22 to a logical 1 on path 23, and for discriminator 39 to change its output on path 43 from a logical 1 to a logical 0 to disable oscillator 44.

Assume that the system stabilizes with a slip between −0.80% and −2.25% until wind again increases to cause slip value encoded in the signal on path 38 to exceed the −2.25% upper limit. At this point, another logical 1 signal is placed on path 43 again causing oscillator 44 to provide a logical 1 pulse on path 45. This pulse causes up-down counter 46 to count up to 2, so that the logical 1 control signal voltage is on path 24 and 0 volts is present on paths 22 and 23. FIG. 3 shows that the system will stabilize with slip around −1.75%, somewhat more negative than −1.60%. This is important for the reasons discussed earlier regarding the change from 600 to 900 rpm synchronous. The +1% limit on instantaneous slip from slip calculator 35 limits the change in time averaged slip from integrator 37 during transition.

After generator 20 is operating in its highest synchronous speed, no further synchronous speed change will occur with increased wind speed until the wind speed becomes so high that propeller 10 begins to feather. With this design, if propeller 10 feathers so completely that it stops rotating, then slip will become 0 and the system will reset to the lowest synchronous speed. Propeller 10 may, however, be designed to only partially feather, so as to permit continued power output by generator 20.

At some time in the future wind beings to decrease, and when average slip for generator 20, as computed by integrator 37 becomes more positive than −1.60%, then oscillator 41 is activated by the logical 1 signal placed on path 40 when discriminator 39 detects this condition. The pulse placed on path 42 by the first cycle of oscillator 41 causes up-down counter 46 to set to 1. This changes generator 20 synchronous speed to 900 rpm, and actual instantaneous slip as carried in the signal on path 36 momentarily to reach about −34%. However, slip calculator 35 is designed to encode a −6% slip value in the signal on path 36 in this case. Thus, the average slip calculated by integrator 37 shifts only slowly toward the −2.25% value which will cause an increase in the synchronous speed specified by counter 46. Generator immediately begins to slow to the new 900 rpm synchronous speed once the signals on paths 22-24 so specify. This generating system will slow to below a slip of −2.25% before the output of integrator 37 can reach −2.25%.

Further reduction in wind speed will cause another such down-shift of synchronous speed from 900 to 600 rpm. The time average of generator 20 slip falls below −0.80% and oscillator 41 counts down counter 46 to 0. For a short time again actual instantaneous slip becomes very negative, but the time averaging by integrator 37 and the −6% limit on slip value encoded by calculator 35 prevents the time average of slip from increasing to greater than −1.30% and causing another change in counter 46 output.

The systems symbolized by FIGS. 1 and 2 display the use of two different system parameters as providing operating characteristics which can be used to determine shift points and direction for synchronous speed changes. There are other possibilities as well, such as phase difference or power factor in the output of generator 20.

It is likely that a commercial system will be dedicated, special purposes control circuitry. The control systems described may well be duplicated by a properly programmed microprocessor at substantially less cost. Furthermore, use of a microprocessor permits additional control features which will increase the efficiency of the installation without any appreciable additional expense, when produced in quantity. Such a system can take other factors into account in selecting synchronous speed changing points, such as previous long term and short term wind history, time of year and day, line distortion currently present and line voltage. Furthermore, unstable wind conditions can more easily be dealt with to prevent hunting or unstable speed selection. The foregoing describes the invention and its preferred embodiments.

What is claimed is:

1. In an electrical generating system of the type for use with a power source of independently variable energy, and producing electric power on paths to be connected to a power grid carrying synchronously generated electricity of predetermined voltage, frequency and phase, comprising:
   (a) an overriding clutch receiving power from the power source at an input shaft and transmitting torque to an output shaft, and preventing transmission of torque from the output to the input shaft;
   (b) an induction generator whose rotor shaft is connected to rotate with the clutch's output shaft, said generator having a plurality of synchronous speeds, each such speed selectable according to a control signal associated with said speed, and said generator's stator winding output terminals comprising the paths to be connected to the power grid;
   (c) a tachometer connected to the input shaft of the generator and producing a signal whose value encodes the input shaft's speed;
   (d) a slip calculator receiving the control signal and the tachometer signal, and responsive thereto, generating a slip signal encoding the slip at which the generator is operating, said slip becoming increasingly negative as generator speed increases above the synchronous speed encoded in the control signal; and
   (e) slip discriminator means receiving the slip signal and the tachometer signal, for comparing the slip value encoded in the slip signal with a first preselected negative slip value and a second preselected slip value more negative than the first, each associated with the synchronous speed encoded in the control signal, and for issuing a control signal specifying a synchronous speed slower than the current synchronous speed responsive to the slip value encoded in the slip signal becoming more positive than the first preselected slip value, and for issuing a control signal specifying a synchronous speed faster than the current synchronous speed responsive to the slip value encoded in the slip signal becoming more negative than the second preselected slip value.

2. The apparatus of claim 1, wherein the slip calculator includes an integrator receiving the tachometer signal and generating the slip signal based on the average slip over an interval of predetermined length immediately preceding the present invention.

* * * * *